Sept. 6, 1966         J. D. NICKERSON ET AL         3,271,107
                SILICA PIGMENTS FROM FLUOSILICIC ACID
                       Filed July 31, 1963
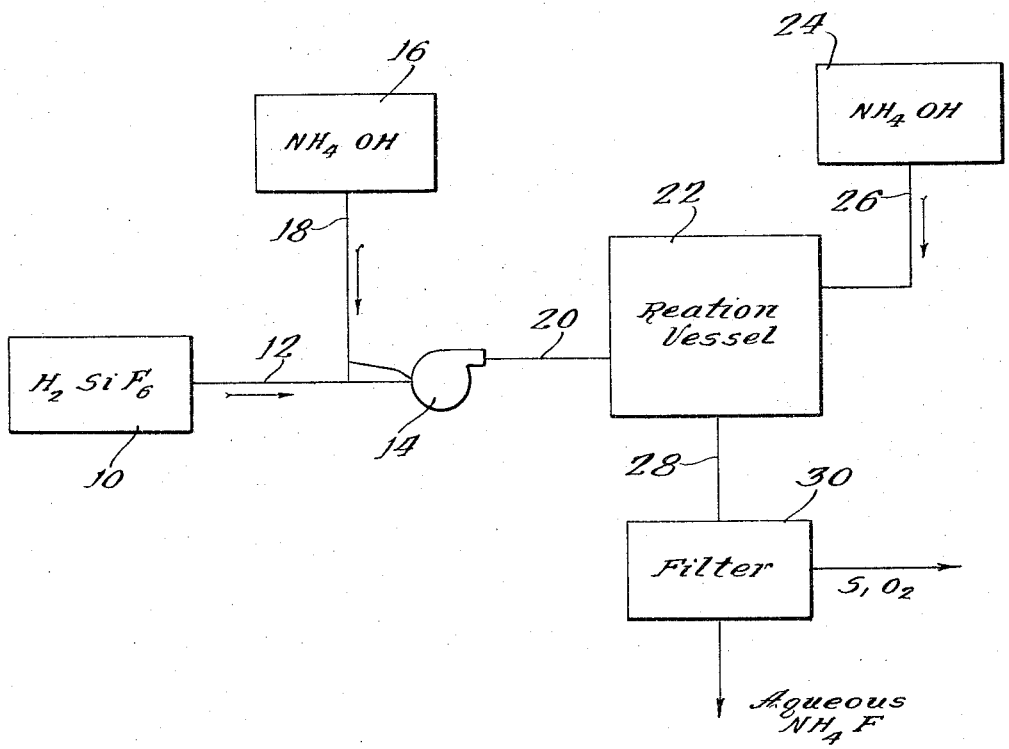
Inventors:
John D. Nickerson
George M. Burkert
By: James E. Wilber
           Attorney:

United States Patent Office 3,271,107
Patented Sept. 6, 1966

3,271,107
SILICA PIGMENTS FROM FLUOSILICIC ACID
John D. Nickerson and George M. Burkert, Lakeland, Fla., assignors to International Minerals & Chemical Corporation, a corporation of New York
Filed July 31, 1963, Ser. No. 298,856
9 Claims. (Cl. 23—182)

This invention relates to a novel method for the production of silica of high quality from fluosilicic acid. In greater particular, the invention relates to a two-stage reaction of fluosilicic acid with ammonium hydroxide by which the quality, and particularly the surface area, of the precipitated silica can be readily controlled.

Fluorine-containing gases are produced as a by-product in the manufacture of fertilizer, phosphoric acid, phosphates, and other phosphorous-containing materials from minerals such as fluorapatite and phosphate rock. When such minerals are reacted with an acid, such as phosphoric acid, sulfuric acid, nitric acid, or hydrochloric acid, which treatment is common in preparing useful materials from these minerals, silicon tetrafluoride is liberated. Silicon tetrafluoride is also liberated when wet process phosphoric acid produced from phosphate rock or fluorapatite is concentrated by evaporation techniques. The liberated silicon tetrafluoride is usually recovered by absorption in water. The silicon tetrafluoride reacts with water to form fluosilicic acid ($H_2SiF_6$). The acid is generally an undesirable by-product having little economic value. The fluorine-containing off gases from the manufacture of various products from phosphatic starting materials are recovered usually for the sole purpose of preventing their escape to the atmosphere. The escape of fluorine-containing off gases results in serious atmospheric pollution problems, since the gases are both corrosive and toxic. It is therefore desirable that a worthwhile use be found for these waste materials.

It is a principal object of this invention to provide an improved method for the manufacture of high grade silica from fluosilicic acid.

Another object of this invention is to provide a method for the manufacture of silica from fluosilicic acid in which accurate control of the surface area of the produced silica is obtained.

Yet another object of this invention is to provide a method for the manufacture of silica of improved quality from fluosilicic acid.

Still another object of this invention is to provide a method for the production of silica from fluosilicic acid by the reaction of the acid with ammonium hydroxide in which dissipation of heat of reaction is conveniently provided.

Yet another object of this invention is to provide a method for the manufacture of silica from fluosilicic acid in which a high uniformity of product grade can be obtained, and ammonia losses reduced. Other objects of the invention will become apparent from the following specification.

Briefly, the method of this invention comprises a two-step process for the production of silica by the reaction of an aqueous solution of fluosilicic acid with ammonium hydroxide in which the fluosilicic acid is first reacted with a less-than-stoichiometric quantity of ammonium hydroxide in a reaction zone of high agitation to produce a product slurry including numerous extremely small silica nucleii. The quantities of the two reactants is controlled to provide a slurry having a pH in the range of 6.0 to 8.0. The product slurry is then discharged into a reaction vessel in which unreacted fluosilicic acid is reacted with ammonium hydroxide in amount sufficient to provide a final pH in the range of 8.3 to 9.0. In a preferred embodiment, the initial stage of the reaction is carried out in a centrifugal pump.

The reaction is best described with reference to the flow sheet shown in the drawing. The aqueous solution of fluosilicic acid which preferably has a concentration of about 15 to 25% by weight of fluosilicic acid is flowed from storage vessel 10, through line 12, to centrifugal pump 14. Ammonium hydroxide stored in vessell 16 is floated through line 18 and admixed with the aqueous solution of fluosilicic acid at the inlet to centrifugal pump 14. The reaction in the pump is substantially instantaneous and occurs under conditions of very high agitation existing in the pump. The product slurry is discharged from the pump through line 20 to reaction vessel 22, in which relatively quiescent conditions are maintained. Further neutralization of the slurry is carried out in batch operation in reaction vessel 22 by passing additional ammonium hydroxide from storage vessel 24, through line 26, to reaction vessel 22. The second stage of the reaction, which occurs in reaction vessel 22, is permitted to go to substantial completion over a time in the range of 20 to 120 minutes. The reaction product is then flowed from vessel 22, through line 28, to filter 30, where silica is removed from the aqueous ammonium fluoride-containing liquor.

The concentration of the fluosilicic acid employed is not critical, but preferably will be in the range of about 15 to 25% by weight fluosilicic acid. The concentration of the aqueous ammonium hydroxide reactant is not critical, and concentrations of about 29% have been found to give satisfactory results. Alternatively, the ammonium hydroxide reactant can be provided by introducing anhydrous ammonia into the stream of aqueous fluosilicic acid immediately upstream of the inlet to the centrifugal pump. The reaction can be carried out at temperatures ranging from 0° C. to ambient temperatures. While it has been found that somewhat superior results are obtainable at reduced temperatures approaching 0° C., for reasons of simplicity and economics it is preferred to carry out the reaction at about ambient temperatures. It has been found that excellent temperature control and disposition of heat of reaction is obtained by carrying out the initial reaction step in a centrifugal pump. In addition to providing excellent heat dissipation, the pump provides the very high agitation required to produce numerous small nucleii of silica in the effluent slurry, and further removes the reactants rapidly from the reaction zone, which is the pump itself, and thus further improves the quality of the product slurry. It will be understood, however, that the process can be carried out by reacting the fluosilicic acid and ammonium hydroxide in any reaction zone in which a high degree of agitation is provided. The centrifugal pump has been found to provide an extremely convenient and efficient reactor.

Pressure conditions within the reactor are not critical, the reaction proceeding satisfactorily at ambient temperatures or such other pressures as may naturally occur in the pump. The final step of the reaction in reaction vessel 22 is likewise carried out at ambient temperature and pressures, but in batch rather than continuous fashion. The rate of addition of ammonium hydroxide is not critical, but it is desirable to introduce the total quantity of ammonium hydroxide to be reacted in the reaction vessel over a relatively short period of time, say five minutes. The separation of the silica from the aqueous mother liquor at filter 30 is conventional.

The relative quantities of fluosilicic acid and ammonium hydroxide reacted in the initial step of the reaction in pump 14 has been found to provide a convenient method for controlling the surface area of the product silica. The quantities of fluosilicic acid and ammonium hydroxide are controlled to provide a slurry pH in the pump effluent in the range of 6.0 to 8.0. It has been found that the surface area of the silica separated at the filter approaches about 160 square meters per gram when the pH is controlled to approach 6.0. The surface area of the product silica separated at the filter approaches about 50 square meters per gram when the pH of the pump effluent approaches 8.0. In the second step of the reaction in reaction vessel 22 quiescent conditions are maintained and the quantity of ammonium hydroxide added is controlled to provide a final pH in the range of 8.3 to 9.0. Again, the ammonium hydroxide reactant can be added in aqueous solution of any convenient concentration or as anhydrous ammonia. The pH variations within the range of 8.3 to 9.0 do not have a great effect upon the quality or surface area of the product silica. It has been found that recoveries of silica are increased by operating at higher final pH's and a final pH of about 8.9 is preferred. Variations in the time of reaction in reaction vessel 22 within the range of 20 to 120 minutes has been found to affect both the yields and the quality of the product silica. In general, longer times result in the production of more highly agglomerated silicas having somewhat reduced surface areas. Longer reaction times, however, result in slightly increased silica yields.

It is desirable that the product silica be readily dispersable and that particle agglomeration be maintained at a minimum so that the product will be suitable for use as a pigment in the manufacture of paints or rubber products. It is for this reason that it is preferred to limit the reaction time to a maximum of about 120 minutes while accepting slightly reduced silica yields.

The process of this invention has been carried out under varying conditions to produce silicas having characteristics satisfactory for use as pigments. The conditions and results of the experiments are set forth in Table I.

during the first step of the reaction fixed the temperature of reaction by the heat capacity of the mixing system. Obviously, the use of more dilute solutions resulted in somewhat lower reaction temperatures than the use of more concentrated solutions. The level of precipitation in the pump was in part determined by the quantity of heat dissipated.

The viscosities and bulk densities reported in Table I can be interpreted as a measure of the dispersability of the product samples. Higher viscosities correlate with decreased bulk densities. Higher surface areas do not yield higher viscosities. This may be due to the partial gel structure of the product and to higher agglomeration. The data in Table I shows that the bulk densities of the double precipitates are lower than the bulk densities obtained when complete neutralization is provided in the pump. Pump precipitation alone produces product silicas having surface areas in excess of 150 square meters per gram. Batch precipitation alone produces product silicas having surface areas below 50 square meters per gram. The process of this invention permits the manufacture of product silicas having surface areas in the range of 50 to 150 square meters per gram.

The embodiments of the invention in which an exclusive property or privilege is claimed are defined as follows:

1. In the preparation of silica by the reaction of fluosilicic acid with ammonium hydroxide in aqueous medium, the improvement comprising carrying out the reaction in two separate stages which comprise:
   (a) reacting fluosilicic acid with ammonium hydroxide in a reaction zone of high agitation, and adjusting the proportions of the reactants to maintain a pH in the range of 6.0 to 8.0, whereby a silica-containing slurry is produced;

*Table I*

COMPLETE PRECIPITATION IN PUMP (ANHYDROUS AMMONIA)

| Test No. | Acid Conc. | Pump pH | Pump Yield SiO$_2$, Percent | Batch Time, min. | Temp., °C. | Batch pH | Surface Area, m.$^2$/g. | Bulk Density, lb./ft.$^3$ | Viscosity, 5 g. SiO$_2$ 100 g. Turpentine | Percent SiO$_2$ Wet Cake |
|---|---|---|---|---|---|---|---|---|---|---|
| 40A | 15.75 | 8.9 | 97 | | | | 185 | | | 14.5 |
| 11A | 24.00 | 8.6 | 90 | | | | 160 | 11.23 | 35 | 14.0 |

PARTIAL PRECIPITATION IN PUMP (ANHYDROUS AMMONIA)

| Test No. | Acid Conc. | Pump pH | Pump Yield SiO$_2$, Percent | Batch Time, min. | Temp., °C. | Batch pH | Surface Area, m.$^2$/g. | Bulk Density, lb./ft.$^3$ | Viscosity, 5 g. SiO$_2$ 100 g. Turpentine | Percent SiO$_2$ Wet Cake |
|---|---|---|---|---|---|---|---|---|---|---|
| 37B | 18 | 7.82 | 63.7 | | | | 198 | | | 15.00 |
| 35A | 18 | 7.8 | 57.3 | | | | 220 | | | |
| 11B | 18 | 7.8 | (50) | | | | 208 | 11.59 | 40 | 12.35 |
| 44A | 24 | 7.8 | 53 | | | | 187 | 14.9 | 15 | |

DOUBLE PRECIPITATION (PUMP AND VESSEL) ANHYDROUS AMMONIA

| Test No. | Acid Conc. | Pump pH | Pump Yield SiO$_2$, Percent | Batch Time, min. | Temp., °C. | Batch pH | Surface Area, m.$^2$/g. | Bulk Density, lb./ft.$^3$ | Viscosity, 5 g. SiO$_2$ 100 g. Turpentine | Percent SiO$_2$ Wet Cake |
|---|---|---|---|---|---|---|---|---|---|---|
| 37C | 18 | 7.82 | 63.7 | 53 | 31 | 8.9 | 120 | 7.64 | 60 | 18.25 |
| 38A | 18 | 7.82 | 63.7 | 190 | 31 | 8.9 | 132 | 6.96 | 90 | 18.55 |
| 39A | 18 | 7.2 | 32.7 | 90 | 33 | 8.99 | 151 | 8.09 | 60 | 15.75 |
| 41B | 15.75 | 6.7 | 27.7 | 86 | 33 | 8.8 | 93 | 11.41 | 20 | 30.0 |
| 14B | 24 | 7.8 | 53.0 | 77 | 32 | 8.9 | 116 | 5.85 | 60 | 13.9 |
| 44C | 24 | 7.8 | 53.0 | 100 | 50 | 8.86 | 93 | 5.44 | 60 | 18.9 |
| 15A | 24 | 7.8 | 53.0 | 125 | 63 | 8.9 | 85 | 6.12 | 65 | 18.2 |

DOUBLE PRECIPITATION (PUMP AND VESSEL) 29% AQUEOUS NH$_4$OH

| Test No. | Acid Conc. | Pump pH | Pump Yield SiO$_2$, Percent | Batch Time, min. | Temp., °C. | Batch pH | Surface Area, m.$^2$/g. | Bulk Density, lb./ft.$^3$ | Viscosity, 5 g. SiO$_2$ 100 g. Turpentine | Percent SiO$_2$ Wet Cake |
|---|---|---|---|---|---|---|---|---|---|---|
| 35B | 18 | 7.8 | 57.3 | 35 | 31 | 8.7 | 147 | 8.89 | 35 | 16.8 |
| 36A | 18 | 7.8 | 57.3 | 100 | 30 | 8.75 | 139 | 6.71 | 45 | 16.3 |
| 1C | 24 | 7.8 | (50) | 19 | 47 | 8.5 | 137 | 8.62 | 115 | 16.78 |
| 1D | 24 | 7.8 | (50) | 24 | 47 | 8.85 | 127 | 8.86 | 125 | 18.41 |

In the procedure employed, fluosilicic acid in an aqueous medium having a concentration as set forth in Table I was reacted either with a 29% aqueous solution of ammonium hydroxide or with anhydrous ammonia, as set forth in the table, in a centrifugal pump to the pH indicated in Table I to precipitated silica to a predetermined yield. The resulting slurry was then passed to a reaction vessel and reacted under batch conditions at ambient temperatures with additional anhydrous ammonia. The pump (b) then reacting said slurry in a quiescent reaction zone with additional ammonium hydroxide in an amount sufficient to provide a final pH in the range of 8.3 to 9.0 for a time of about 20 minutes to 120 minutes, and separating precipitated silica from the resulting slurry.

2. The method in accordance with claim 1 in which said aqueous fluosilicic acid has a concentration in the range of 15 to 25% by weight.

3. The method in accordance with claim 2 in which the final pH is about 8.9.

4. In the preparation of silica by the reaction of fluosilicic acid with ammonium hydroxide in an aqeuous medium, the improvement comprising continuously introducing an aqeuous solution of fluosilicic acid and ammonium hydroxide into a rection zone of high agitation, controlling the ratio of fluosilicic acid in ammonium hydroxide to maintain in said reaction zone a pH in the range of 6.0 to 8.0, continuously withdrawing from said reaction zone a product slurry, introducing said slurry to reaction vessel, reacting said slurry with additional ammonium hydroxide in an amount sufficient to provide a final pH of 8.3 to 9.0 for a time of 20 to 120 minutes, and separating precipitated silica from the slurry.

5. The method in accordance with claim 4 in which said aqueous fluosilicic acid has a concentration in the range of 15 to 25% by weight.

6. The method in accordance with claim 4 in which the final pH is about 8.9.

7. In the preparation of silica by the reaction of fluosilicic acid with ammonium hydroxide in an aqueous medium, the improvement comprising introducing an aqueous solution of fluosilicic acid to the inlet of a centrifugal pump, reacting said fluosilicic acid while in said pump with ammonium hydroxide in an amount sufficient to produce a pump effluent having a pH in the range of about 6.0 to 8.0, discharging the pump effluent into a reaction vessel, reacting said effluent in said vessel with ammonium hydroxide in an amount sufficient to provide a a final pH in the range of 8.3 to 9.0 for a time of 20 to 120 minutes, and separating precipitated silica from the reaction product.

8. The method in accordance with claim 7 in which said aqueous fluosilicic acid has a concentration in the range of 15 to 25% by weight.

9. The method in accordance with claim 8 in which the final pH is about 8.9.

References Cited by the Examiner

UNITED STATES PATENTS

| | | | |
|---|---|---|---|
| 1,235,552 | 8/1917 | Chappell | 23—88 |
| 2,780,522 | 2/1957 | Gloss et al. | 23—182 XR |
| 3,111,384 | 11/1963 | Heckathorn et al. | 23—182 |

OSCAR R. VERTIZ, *Primary Examiner.*

BENJAMIN HENKIN, *Examiner.*

H. S. MILLER, *Assistant Examiner.*